Aug. 29, 1967   E. J. KNAPP   3,338,999
METHOD OF ASSISTING MOLD CAVITY FILL
Filed June 15, 1964
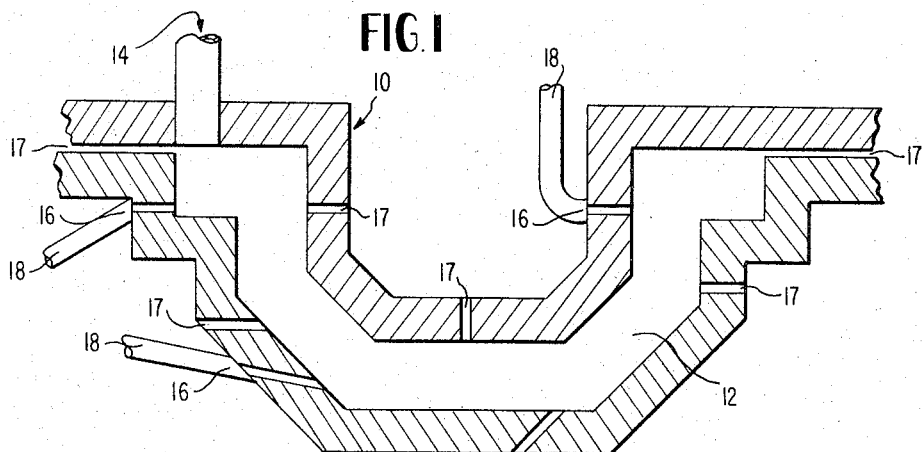
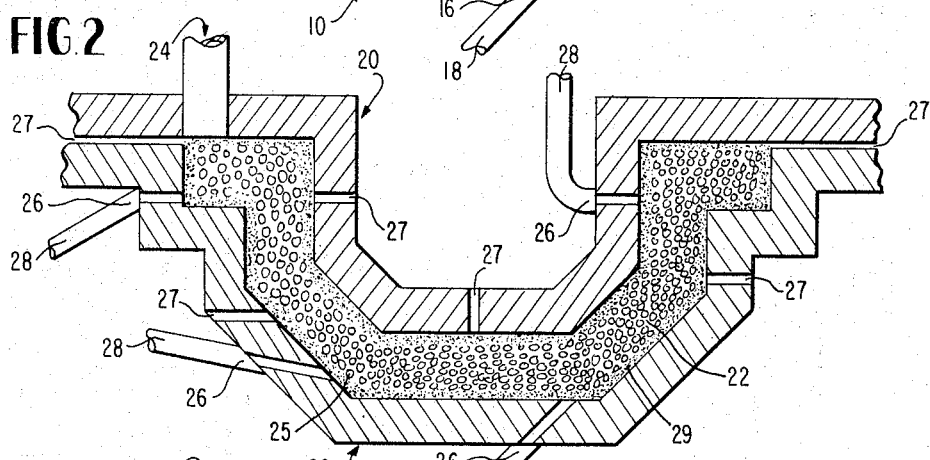
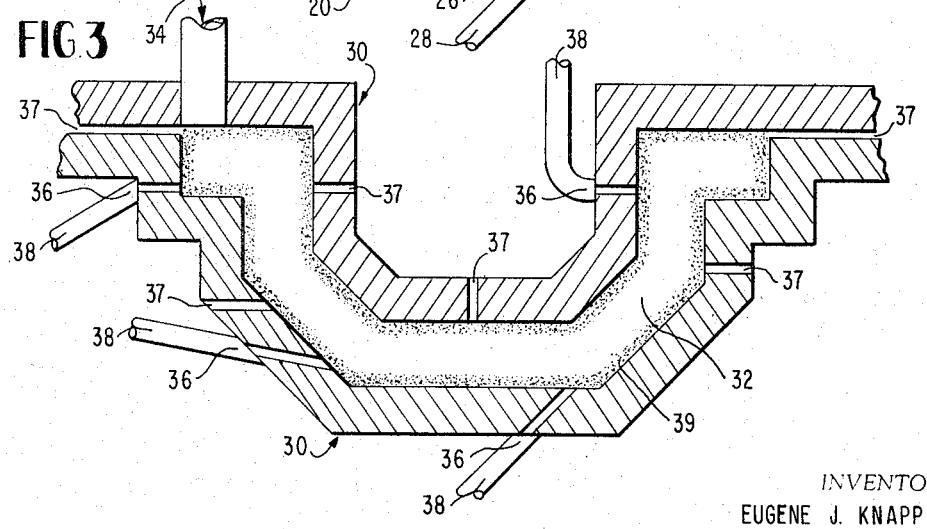
INVENTOR.
EUGENE J. KNAPP
BY
Sughrue, Rothwell, Mion and Zinn
ATTORNEYS

3,338,999
METHOD OF ASSISTING MOLD CAVITY FILL
Eugene J. Knapp, Corning, N.Y., assignor to Corning Glass Works Inc., Corning, N.Y., a corporation of New York
Filed June 15, 1964, Ser. No. 374,956
12 Claims. (Cl. 264—113)

This invention relates to a method for assisting the filling of mold cavities.

In recent years, the technology of molding has vastly improved. One area of present importance is the molding of irregular shaped articles from solid, powdered, expanded, or pelleted starting materials. The products formed by molding these materials have found use in such diverse fields as sintered metallic parts and synthetic resin or glass dinnerware.

Various problems have been encountered in molding these materials. One of the more perplexing problems in the field today is the filling of the mold cavity with the material to be molded prior to the heating step. It is frequently found that when irregular shaped molds are used, the material to be molded either does not fill all portions of the mold or that certain sections of the mold are less densely packed with moldable material than are other sections. The art has suggested several methods for solving this problem. One of the first was to simply suspend the moldable material in an air stream, which is then blown in to the mold cavity. This method has generally proved unsatisfactory as the moldable material has a tendency to pack into certain portions of the mold thereby interfering with the flow of the air and moldable material and causing later entering particles to lose velocity, which results in a nonuniformly filled mold. Another proposed method was to simply rotate the mold after the moldable material was introduced. In practice, this method has proven difficult particularly when large objects are to be formed. The further disadvantage of a rotating mold is the expense involved in rotatably mounting the mold and in powering it. It has also been proposed to coat the inside of the mold cavity with a sticky material to which the moldable material will adhere. The provision of this additional material has proven costly and is accompanied by the further defect that a harmful residue will often remain on the molded article. This residue is particularly troublesome in the fabrication of dinnerware and must be removed at additional expense.

The difficulties involved in uniformly filling a mold cavity are increased when it is desired to form a molded article having different portions of the article composed of different materials.

Accordingly, it is an object of this invention to provide an improved method for uniformly filling a mold cavity.

Furthermore, it is an object of this invention to provide a method of assisting the filling of a mold cavity by establishing a controlled gas flow within the mold cavity which results in a uniformly filled mold.

More specifically, it is another object of this invention to provide a method for uniformly filling a mold cavity by forcing a gas under pressure through at least one filling orifice or opening in the wall of the mold cavity to thereby create a directional or rotational gas flow within the mold cavity and then charging the mold cavity with the material to be molded. For purposes of this invention the mold cavity only includes the actual forming cavity.

An additional object of this invention is to provide a method of filling a mold cavity which will permit articles having a thermoplastic or thermosetting exterior and an interior of a different material to be formed.

These and other objects of this invention are accomplished by assisting the filling of a mold cavity with a directional flow of gas within the cavity. This directional flow of gas within the mold is provided for by forcing gas into the mold cavity through at least one orifice in the wall of the mold. By strategically placing a plurality of such orifices inside the cavity, it is possible to achieve circulation of the gas throughout the mould with the concomitant circulation of the material to be molded. This results in a mold cavity uniformly filled throughout.

Any gas not detrimental to the specific material being molded may be used. In practice, compressed air is usually employed as it is readily available and extremely inexpensive. Where it is desirable to effect molding in the absence of oxygen, gases such as nitrogen and argon may be employed.

In practicing this invention, the moldable material may be simply poured into the mold or fed in through a hopper. The directional or circulating flow of gas within the mold will result in a uniformly filled cavity. It is, however, desirable to introduce the material to be molded into the mold by suspending it in an air stream which is directed into the cavity through a filling orifice. The particles of moldable material suspended in the air stream are thus travelling at a relatively high velocity before encountering the directional air flow within the cavity. By regulating the two air flows during the filling operation, complete and uniform caviy fill can be regularly obtained.

It is desirable to provide a means by which the gas pressure can be vented from the mold. This can most easily be done by providing relatively small escape orifices in the wall or through vents between the mold sections. The size of these escape ways will be normally dictated by the particle size of the material to be molded. It is preferable to only permit the gas to escape through these vents and thus the escape orifice should be smaller than the particle size of the moldable material.

The present method can be effectively used to achieve molds uniformly filled with any solid, powdered, expanded, or pelleted material. Such diverse material as synthetic resins, ceramics, glass, metals and wood may be used.

It is often required to produce an article having a skin of one material and an interior of another. This can easily and reliably be done by employing the present method. When a powdered thermoplastic material and expandable synthetic resin beads are introduced into a mold cavity in which there has been established a rotational air flow, it is found that the smaller and heavier particles of thermoplastic material migrate to the walls of the mold while the larger and lighter expandable synthetic resin beads are directed toward the center of the cavity. This desirable result can be explained by considering the effect which the centrifugal forces within the cavity have upon the materials. The smaller thermoplastic powder is more easily accelerated than the larger beads and is thus thrown to the walls of the cavity. When the less easily accelerated and thus slower moving expandable resin beads reach the walls of the cavity, a layer of thermoplastic powder has already formed there. This result is independent of the order in which the materials were introduced into the cavity. In practice, it is preferred to either charge the mold with a mixture of the two materials or to introduce the thermoplastic prior to the introduction of the expandable beads. When a mold cavity charged by this technique is heated, an article having a tough and impervious thermoplastic skin and a porous and resilient foamed interior will be obtained.

Another embodiment of this invention also permits a molded article containing layers of different materials to be formed. This is achieved by partially filling a heated mold with a thermoplastic or thermosetting material. By forcing air under pressure into the mold cavity through at least one suitably oriented orifice in the wall of the cavity, a rotational or directional air flow is created. This air flow causes the materials introduced to migrate to the walls of he mold. When the particles contact the hot walls, a uniform layer of the materials will be formed on the walls. By later introducing another moldable material into a mold having its walls coated by this technique, a molded article having a skin of one material and an interior of the later introduced material can be formed.

Other objects of the invention will be pointed out in the following description and claims and illustrated in the accompanying drawings, which disclose, by way of example, the principle of the invention and the best mode which has been contemplated of applying that principle.

In the drawings:

FIG. 1 is a cross-sectional view of a mold suitable for use in practicing the method of this invention;

FIG. 2 is a cross-sectional view of a mold suitable for use in this method which has been filled with a thermoplastic powder and expandable synthetic resin beads;

FIG. 3 is a cross-sectional view of a mold suitable for use in this method and having its walls coated with a layer of a thermoplastic or thermosetting material.

In FIG. 1 there is shown a substantially closed but vented mold 10 having a mold cavity 12 and a filling orifice 14. The walls of the mold 10 are provided with a plurality of gas introducing orifices 16 directed somewhat tangentially to create directional gas flow such as rotating or circulating air within the mold cavity 12. These gas introducing orifices 16, hereinafter referred to as air jets, are connected to a source of pressurized gas by conduits 18. The walls of mold 10 are further provided with vents 17.

In practicing this method, air under pressure is forced through air jets 16 and into the mold cavity 12. This creates a directional or rotational air flow within cavity 12. When a powdered, solid, expanded, or pelleted material to be molded is introduced into the cavity 12 through the filling orifice 14, it encounters the rotational air flow. This results in a thorough circulation of the moldable material throughout cavity 12 and thereby achieves uniform filling of cavity 12. Any excess air pressure can escape through vents 17. It has been found that if the flow of air through jets 16 is allowed to continue throughout the filling of the mold, there will be a tendency for the air to force the moldable material away from the jets 16. This could lead to non-uniform filling. Thus, it is preferred to discontinue the flow of air through jets 16 just prior to ending the filling of the mold. By doing this, the mold will be uniformly filled.

Although a plurality of jets 16 have been shown, it may be unnecessary to have more than one. In practice, it is desirable to have the jets 16 of a diameter less than $\frac{1}{16}$ of an inch. The size of the vents 17 is dictated by the particle size of the material to be molded. These vents should be large enough to permit escape of the gas within the mold, but small enough to prevent outflow of moldable material.

The material to be molded may be introduced into the mold through filling orifice 14 in any conventional manner. It can be simply dumped into the cavity from a hopper or may be first suspended in an air stream which is directed through orifice 14. The technique of introducing the material into the mold is not critical for it is the directional flow of air within the mold which carries the particles of moldable material to the difficult to fill areas of cavity 12.

FIG. 2 shows a substantially closed mold 20, vented at 27, having its mold cavity 22 filled with thermoplastic powder 29 and expandable synthetic resin beads 25. The powder 29 is located adjacent the walls of cavity 22 while the expandable synthetic resin beads 25 are in the interior of cavity 22. This result is achieved by forcing air under pressure from conduits 28 through air jets 26 and into the mold cavity 22 to thereby establish a directional such as a rotational type air flow within cavity 22. When thermoplastic powder and expandable synthetic resin beads are introduced into cavity 22 through filling orifice 24, the materials will align themselves to yield a mold cavity filled in the manner shown. The alignment of the materials is caused by the centrifugal force at work within the mold cavity. The heavier and smaller thermoplastic powder is accelerated by this force and is thus thrown to the walls of the cavity. The lighter and larger expandable synthetic resin beads react sluggishly in the rotational air flow and by the time they near the walls of the cavity, a layer of powdered thermoplastic has formed there.

The method of introducing the materials 25 and 29 into the mold is not critical. Thus, the thermoplastic powder 29 may be introduced prior to the introduction of synthetic resin beads 25. Alternatively, the materials may be mixed and introduced simultaneously. They may be suspended in an air stream which is then forced through filling orifice 24.

FIG. 3 shows a substantially closed mold 30, vented at 37, which has been partially filled with thermosetting or thermoplastic materials by the method of this invention. Air under pressure is carried from conduits 38 through air jets 36 and into mold cavity 32 to thereby establish a desired directional or rotational air flow in cavity 32. The mold 30 is heated and powdered thermoplastic or thermosetting material 39 is introduced therein through filling orifice 34. The rotational or directional air flow causes the particles to migrate to the walls of the cavity 32 where they are formed into a uniform layer by contact wih the hot walls.

The partially filled mold, shown in FIG. 3, can then be charged with another moldable material. Obviously, this latter filling step will not be aided by the induced air flow, as a uniform coating has been formed on the walls of the cavity 32. However, as a skin has been formed on all the walls including the more difficult to fill sections, a relatively uniform fill can be obtained. By heating the filled mold to a suitable molding temperature, an article having a skin of material 39 and an interior of the later introduced moldable material can be obatined.

While there have been shown and described and pointed out the fundamental novel features of the invention as applied to the disclosed embodiments, it will be understood thta various omissions and substitutions and changes in the form and details of the method illustrated and described may be made by those skilled in the art without departing from the spirit of the invention. It is the intention, therefore, to be limited only as indicated by the scope of the following claims.

What is claimed is:

1. A method of uniformly filling a substantially closed mold cavity comprising, introducing into said mold cavity a flowing gas stream in a desired direction, supplying particulate material to be molded into said mold cavity separately of the introduced flowing gas stream, circulating the particulate material throughout the mold cavity by said flowing gas stream to produce an improved uniform filling of said mold cavity, and thereafter molding the material therein to form a composite article.

2. The method of claim 1, wherein said gas is air.

3. The method of claim 1, wherein the material to be molded comprises thermoplastic powder and expandable synthetic resin beads and the rotational gas flow causes the thermoplastic powder to migrate to the walls of the mold cavity and further causes the expandable synthetic resin beads to migrate to the interior of the mold cavity and thereby results in a mold cavity having powdered thermoplastic material adjacent its walls and a uniform layer of expandable synthetic resin beads in its interior.

4. The method of claim 1, wherein a powdered material selected from the group consisting of thermoplastic and thermosetting materials is introduced into a heated mold cavity prior to the introduction of the material to be molded and the directional gas flow causes said powdered material to form a uniform layer upon the walls of said mold cavity.

5. A method of uniformly filling a substantially closed mold cavity comprising introducing into said mold cavity a flowing directional air stream by forcing air under pressure into said mold cavity through at least one orifice in the walls of said mold cavity, supplying particulate material and suspending said material to be molded in a second air stream, thus charging said mold cavity with said second air stream to thereby uniformly fill said mold cavity, and thereafter molding the material therein to form a composite article.

6. The method of claim 5 wherein the filling of said mold cavity continues after stopping the directional flow of air within the cavity.

7. The method of filling a substantially closed but vented mold cavity comprising, introducing into said mold cavity a flowing air stream with such an orientation to the cavity to create a rotational flow therewithin, charging said mold cavity separately of said injecting air with a powdered thermoplastic material and expandable synthetic resin beads, flowing said thermoplastic powder toward the walls of said mold cavity and migrating said expandable synthetic resin beads toward the interior of said mold cavity by such rotational air flow, and thereby forming a mold cavity having powdered thermoplastic material adjacent its walls and a uniform layer of expandable synthetic resin beads in the interior thereof and thereafter molding the material therein to form a composite article.

8. The method of claim 7, wherein said thermoplastic powder is introduced into said mold cavity prior to the introduction of said synthetic resin beads.

9. The method of claim 7, wherein said thermoplastic powder and said expandable synthetic resin beads are introduced into said mold cavity simultaneously.

10. The method of claim 7, wherein said air is injected into said mold cavity substantially tangentially to wall surfaces thereof.

11. A method of filling a substantially closed and heated, but vented mold cavity comprising, forcing air under pressure into said heated mold cavity through at least one orifice in the wall of said mold cavity, creating a rotational air flow within such cavity, introducing a powdered material selected from the group consisting of thermoplastic and thermosetting materials into said mold cavity separately of the first air stream, uniformly coating the walls of said mold cavity with said material, then introducing a material to be molded into said mold cavity, and thereafter molding the material therein to form a composite article.

12. A method of uniformly filling a substantially closed, but vented mold cavity comprising, establishing a flow of gas in a desired direction within said mold cavity, introducing material to be molded within the closed mold cavity independently of the established gas flow therein, circulating the material to be molded within the mold cavity to provide uniform filling, and thereafter molding the material therein to form a composite article.

References Cited
UNITED STATES PATENTS

| | | | |
|---|---|---|---|
| 3,068,526 | 12/1962 | Croan | 264—51 |
| 3,111,710 | 11/1963 | Plymale | 264—53 |
| 3,165,570 | 1/1965 | Deutsch | 264—212 |

ROBERT F. WHITE, *Primary Examiner.*

J. R. HALL, *Assistant Examiner.*